United States Patent [19]

Huenniger et al.

[11] 4,037,405
[45] July 26, 1977

[54] TWO DIMENSIONAL NOZZLE WITH ROTATING PLUG

[75] Inventors: Edward A. Huenniger, East Hartford, Conn.; Robert M. Spurrell, Auburn, Wash.

[73] Assignee: United Technologies Corporation, Hartford, Conn.

[21] Appl. No.: 618,091

[22] Filed: Sept. 30, 1975

[51] Int. Cl.² .............................. F02K 1/12; F02C 7/18
[52] U.S. Cl. ........................................ 60/229; 60/230; 60/271; 239/265.27; 239/265.37; 239/265.39
[58] Field of Search ............................ 60/229, 230, 271; 239/265.25, 265.27, 265.29, 265.31, 265.35, 265.37, 265.39, 265.41, 265.43

[56] References Cited

U.S. PATENT DOCUMENTS

| 2,972,226 | 2/1961 | Geary ............................... 239/265.39 |
| 3,040,523 | 6/1962 | Price ................................ 239/265.25 |
| 3,081,597 | 3/1963 | Kosin et al. ....................... 239/265.25 |
| 3,102,389 | 9/1963 | Pedersen et al. ................. 239/265.27 |
| 3,299,638 | 1/1967 | Santamaria et al. .................... 60/230 |
| 3,558,058 | 1/1971 | Lennard et al. ......................... 60/230 |
| 3,570,247 | 3/1971 | Denning et al. ........................ 60/230 |
| 3,721,389 | 3/1973 | MacKinnon et al. ............... 60/226 R |

FOREIGN PATENT DOCUMENTS

| 1,458,200 | 11/1966 | France .............................. 239/265.31 |
| 906,384 | 9/1962 | United Kingdom ............ 239/265.39 |
| 950,288 | 2/1964 | United Kingdom ............ 239/265.39 |

*Primary Examiner*—Carlton R. Croyle
*Assistant Examiner*—Robert E. Garrett
*Attorney, Agent, or Firm*—Norman Friedland

[57] ABSTRACT

A two dimensional expansion nozzle having a rotating plug serves to block flow, meter flow and afford thrust vectoring. Adjustable walls cooperate to obtain these features and may be adjusted independently to vary nozzle throat area. Cooling means are disclosed. This invention has particular application for VTOL aircraft.

14 Claims, 6 Drawing Figures

TWO DIMENSIONAL NOZZLE WITH ROTATING PLUG

CROSS REFERENCE

This application relates to the subject matter disclosed in an application filed on even date by Edward B. Thayer entitled "Flap-Type Two-Dimensional Nozzle Having a Plug" and assigned to the same assignee.

BACKGROUND OF THE INVENTION

This invention relates to means for exhausting the working fluid medium of a turbine power plant particularly adapted to propel aircraft of the vertical take-off and landing (VTOL) class.

In VTOL aircraft the vertical lift, as for example in the Harrier aircraft, is obtained by directing the exhaust from the power plant in a vertical direction normal to the aircraft. In this instance the exhaust is diverted from its normal axial direction, in contrast to rotating the entire engine from a horizontal to a vertical position.

This invention is particularly directed to this type of aircraft configuration where the engine remains fixed and the exhaust gases developing the aircraft propelling force are routed to give the vertical and horizontal thrust. This invention contemplates utilizing a rotatable plug extending from the side walls of a two-dimensional nozzle and top and bottom aerodynamically continuous walls moveable to define certain nozzle configurations. Hence, in the take off regime for vertical lift, a valve or flow diverting means is opened exhausting the gases normal to the airplane's horizontal axis, while the plug is rotated in a closed position. When transitioning from the vertical to the normal (horizontal) flight condition, the plug and top and bottom walls are actuated so that they cooperate to form an efficacious vectoring nozzle while metering the exhaust in order to obtain a smooth transition while the heretofore opened valve is being actuated closed.

It is also contemplated that in the horizontal flight mode the top and bottom flaps control the nozzle throat area and the plug remains fixed in a given position.

Since the plug/nozzle configuration is operated in the hot gaseous stream, cooling means are contemplated and additionally the cooling structure is utilized to afford structural support.

SUMMARY OF THE INVENTION

An object of this invention is to provide for an aircraft of the VTOL class improved means for routing the exhaust gases of a turbine type power plant from a horizontal to vertical direction and vice-versa.

A still further object of this invention is to provide a two-dimensional multiple expansion rotating plug where the plug both blocks and vectors the exhaust flow. The throat area is adjusted by top and bottom aerodynamically continuous walls.

A still further object of this invention is to provide means for vectoring the exhaust gases while partially metering the flow so as to obtain a smooth transition from the vertical to horizontal flight mode.

A still further object of this invention is to utilize a heavy-walled tube passing through the center of the plug and acting as a tension tie between side plates for good structural characteristics while at the same time providing a manifold for distributing cooling air through the horizontal type of wall construction of the plug. The plug also carries fluid directing means for conducting the cooling flow from the center of the plug to its leading edge through channels formed by the ribs in the sandwiched rib construction to be ultimately discharged through the trailing edge. A portion of fluid is discharged adjacent the outer skin at the leading edge to form a film of cooling air.

Other features and advantages will be apparent from the specification and claims and from the accompanying drawings which illustrate an embodiment of the invention.

DESCRIPTION OF THE PREFERRED EMBODIMENT

Figure 1:
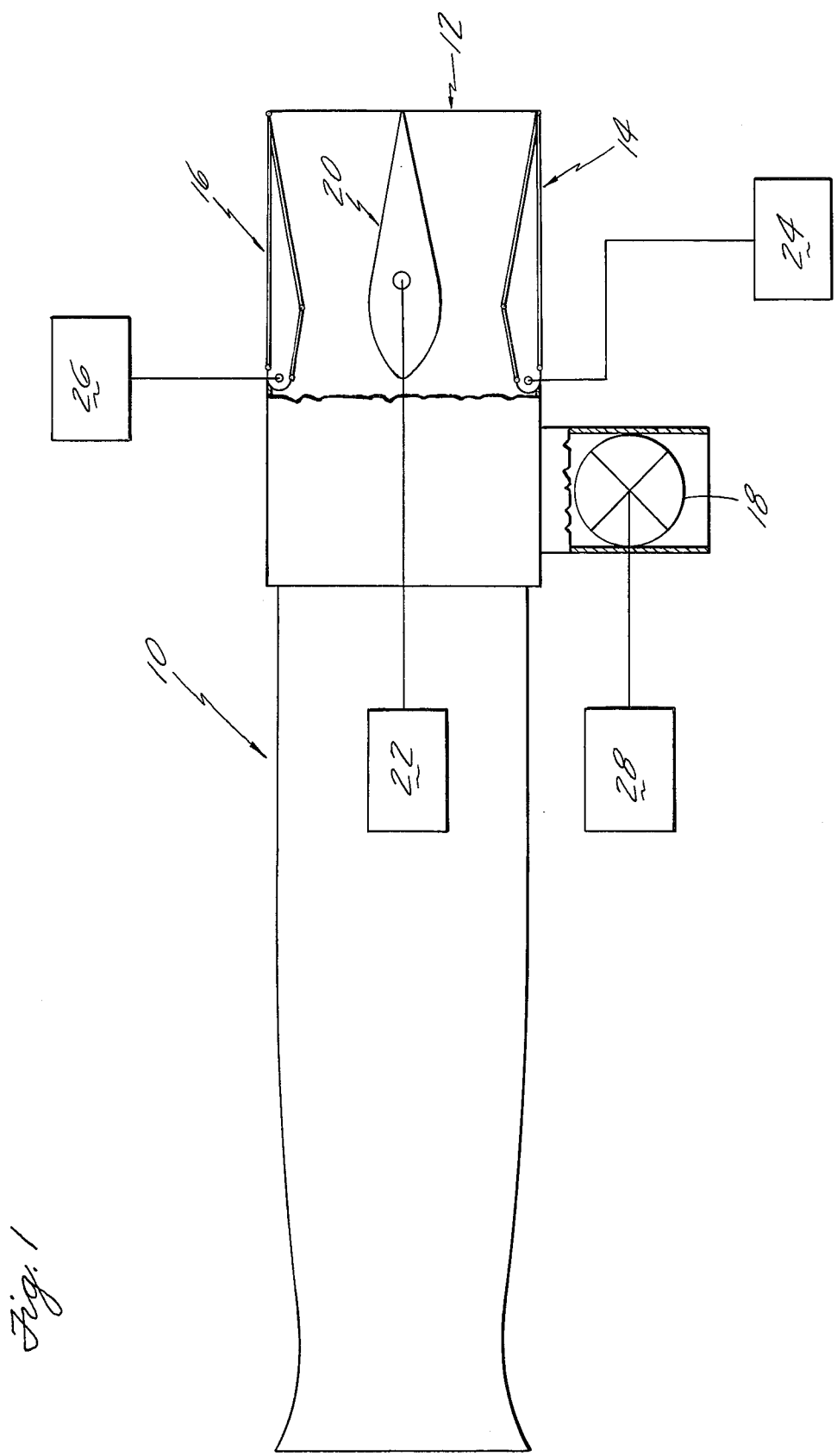
FIG. 1 is a schematic illustrating the invention.

The invention can best be understood by referring to FIG. 1 which shows a turbofan engine in blank generally illustrated by reference numeral 10 which carries at the aft end two-dimensional nozzle 12 having variable bottom wall 14 and top wall 16 and rotatable plug 20. As will be more fully illustrated hereinbelow, suitable means as for example schematically illustrated valve 18 directs the engine exhaust gases downwardly to provide the lift thrust when the engine is mounted in a VTOL aircraft. In this instance rotatable plug 20 will be in the closed position.

For the purpose of illustrating this invention the controls illustrated by blank boxes 22, 24, 26 and 28 serve to position the plug, walls and valve in the manner to be described herein and any suitable control means may be employed for this purpose.

It is to be understood that there is no limitations to the location of the plug-nozzle or as to the type of engine employed as one skilled in the art will appreciate that the particular engine, the location of the nozzle and the controls utilized will be determined by the particular aircraft and its mission. An example of a suitable fan engine is the JT-8D manufactured by Pratt & Whitney Aircraft, a division of United Technologies Corporation.

Figure 2:
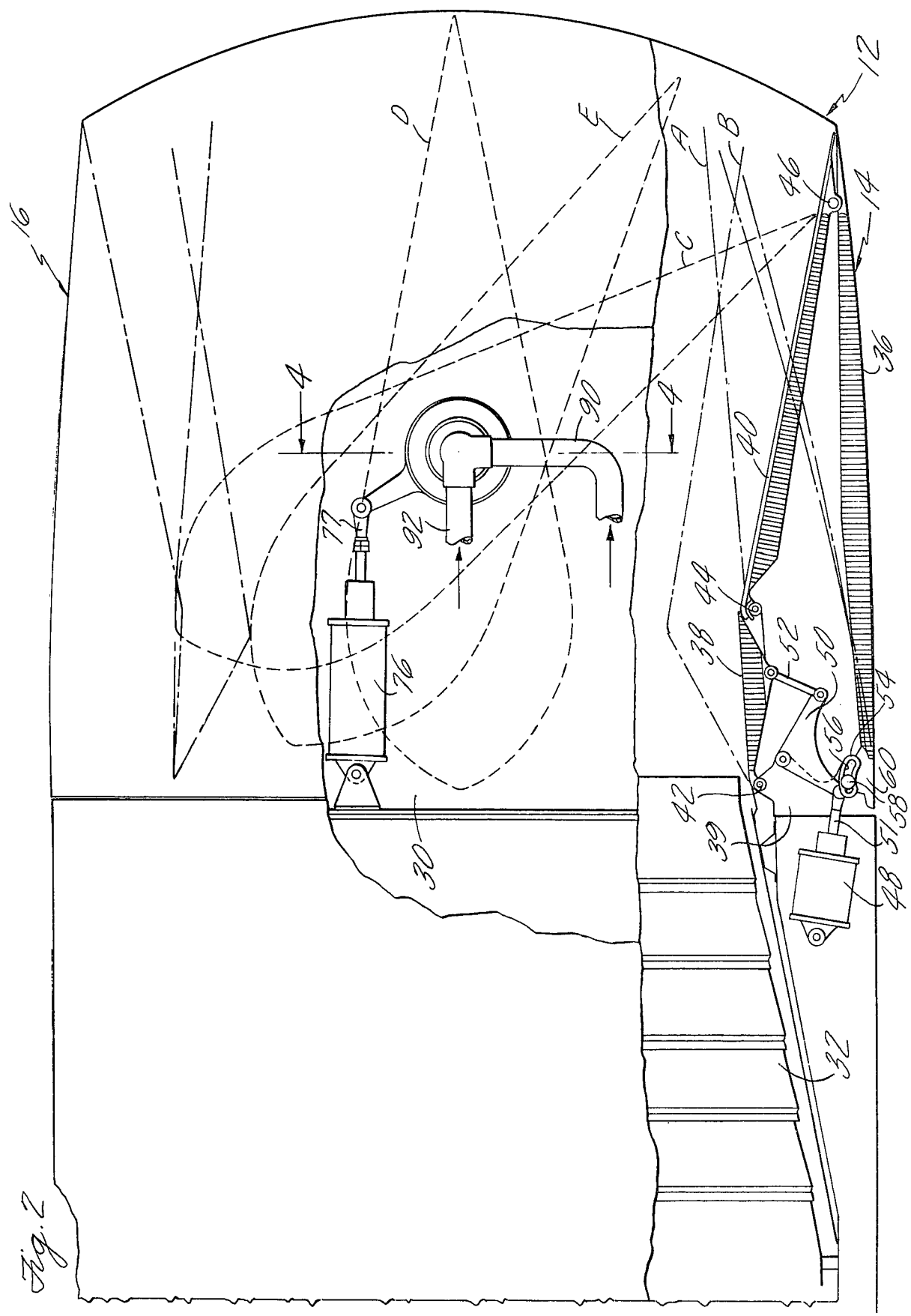
FIG. 2 is a partial view partly in elevation, phantom and section illustrating the details of this invention.

In the preferred embodiment, as noted in FIG. 2, two-dimensional nozzle 12 formed of substantially paralley spaced side walls 30 and 31 and bottom and top flaps 14 and 16 defining a square shaped passage is suitably mounted to the end of the tail pipe 32. Tail pipe 32 is conventionally constructed of the louver design having suitable skin cooling means and fairs from a circular cross section to a square cross section to accommodate two-dimensional nozzle 12. Mounted within the nozzle 12 is rotatable plug 20 which is shaped in an airfoil configuration extending from opposing side walls with the leading edge upstream in the gaseous flow direction. It is contemplated that side walls supporting the plug is, within tolerances, parallel and one aspect of this invention is the combined cooling means and support means for achieving this end to be fully explained hereinbelow Bottom wall 14 and top wall 16 are identically constructed and for the sake of simplicity only the details of flap 14 will be described. As best viewed in FIG. 2 the movable, jointed wall 14 comprises three moveable panels, outer panel 36, and inner panels 38 and 40 each constructed with honeycomb material sandwiched between flat plate-like elements. Each panel is linked to at least one other panel to enable the wall to move as a unit. This allows the wall to present an aerodynamically smooth surface to the gaseous flow. Each panel extends to side walls 30 and 31 and is closely fitted thereto to minimize leakage around the edges. The fore end of panel 38 is hingedly connected by suitable fixed hinge assembly 42 to member 39 which may be grounded to either the engine or aircraft structure. The aft end of panel 38 is suitably hinged to the fore end of panel 40 by the movable hinge assembly 44. The inner panel 40 and outer panel 36 are pivotally connected at their aft end by a suitable hinge assembly 46.

Actuation of bottom wall 14 is by actuator 48 which rectilinearly positions connecting rod 51 pivotally connected to the bottom end of bell crank 50. Bell crank 50 is likewise pivotally connected to grounded member 39. The other outer end of bell crank 50 is pivotally connected to link 52 which in turn is suitably pivotally connected to the bottom of panel 38. Carried on the lower end of bell crank 50 is boss 54 in which has formed therein cam slot 56. Pin 58 extends into slot 56 and is fixed to the extending arm 60 formed integral with panel 36. This linkage, i.e. bell crank 50, cam slot 56 and link 52 serve to position flap 14 in the positions shown in full and phantom (identified by A and B) and positions therebetween. When the aerodynamically smooth wall 14 is moven, cam slot 56 cooperates with pin 58 to keep the aft most end of panel 40 in close relation to the aft end of panel 36. The gap formed between the aft ends of the panels is the base region and must be kept small to minimize aerodynamic losses. In the position shown in full wall 14 is fully deployed to accommodate the trailing edge of plug 20 which bears against the inner face of panel 40 to block the flow with a minimum of leakage. Wall 16 is likewise deployed so that it bears against the leading edge to form a good seal.

In accordance with this invention, walls 14 and 16 can be independently adjusted or independently and synchronously adjusted and cooperate with plug 20 which likewise can be independently or independently and synchronously coordinated with the walls to form a blockage, vectoring and metering means. The walls can be adjusted in horizontal flight to change the nozzle throat area.

Figure 3:
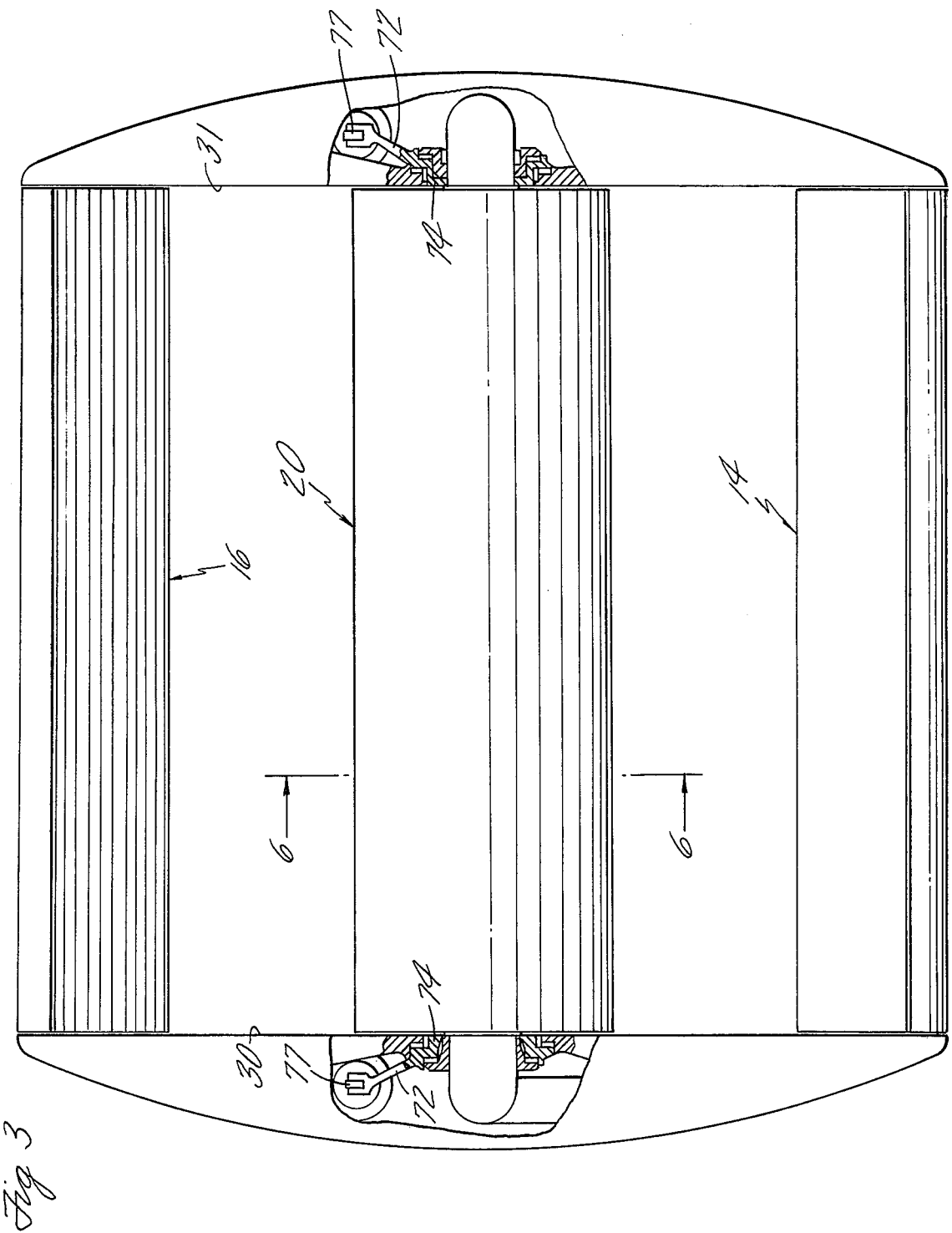
FIG. 3 is a rear view of the plug nozzle configuration.
Figure 4:
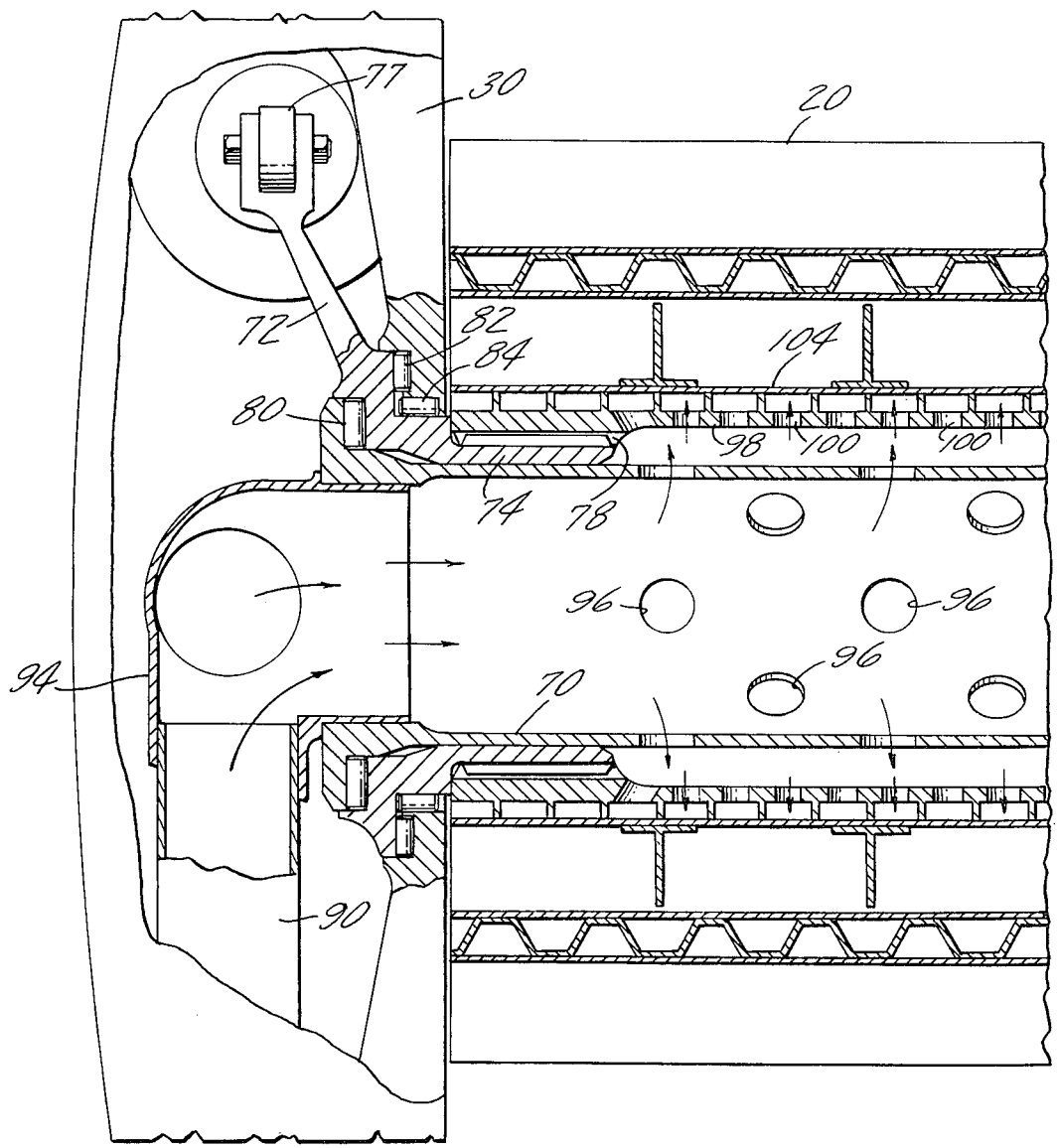
FIG. 4 is a partial sectional view taken along line 4—4 of FIG. 2.

As viewed from FIGS. 3 and 4, plug 20 is centrally supported in the nozzle between side walls 30 and 31 by fixed hollow tube 70 extending through each wall which also supports the two walls in parallel relation. As will be noted tube 70 not only structurally ties the two walls and maintains the parallelism necessary for minimizing leakages between the walls and ends of the plug but also distributes the cooling air to the sandwiched rib construction of the plug. The actuating arm 72 extending from stub shaft 74 connects to the actuator 76 via connecting rod 77 (see FIG. 2) for rotating plug 20. Rotary motion is transmitted through the spline connection 78 so that the plug rotates about tube 70. Suitable roller bearings 80, 82 and 84 mounted out of the exhaust flow stream, i.e. on the outer side of walls 30 and 31 serve to take up the radial and thrust loads. The actuating and support structure on the left end of plug 20 is identical to the actuating and support structure on the right hand end.

It is apparent from the foregoing that control 22 serves to position plug 20 by relaying a control signal to dual actuators 76 and each synchronously through the connecting arm 72 and spline 78 rotates the aerodynamically balanced plug 20 to the desired positions. Additionally, controls 24 and 26 serve to actuate walls 14 and 16 through respective actuators for obtaining certain nozzle and thrust characteristics. The earlier mentioned coordination of the horizontal walls to obtain blockage of the flow from the nozzle is represented in FIG. 2 by the phantom of the plug, reference letter C. In this mode of operation the leading and trailing edges of the plug bear against horizontal walls 16 and 14 respectively. During normal flight, plug 20 will be positioned in the horizontal position indicated by reference letter D, at an angle affording the least resistance to the exhaust gas stream and aerodynamically balancing it. Horizontal walls 14 and 16 may be adjusted to vary the throat area for various aircraft flight modes. Vectoring and metering is obtained when the plug is in the position indicated by reference letter E or at any location between it and the full blockage position.

Figure 5:
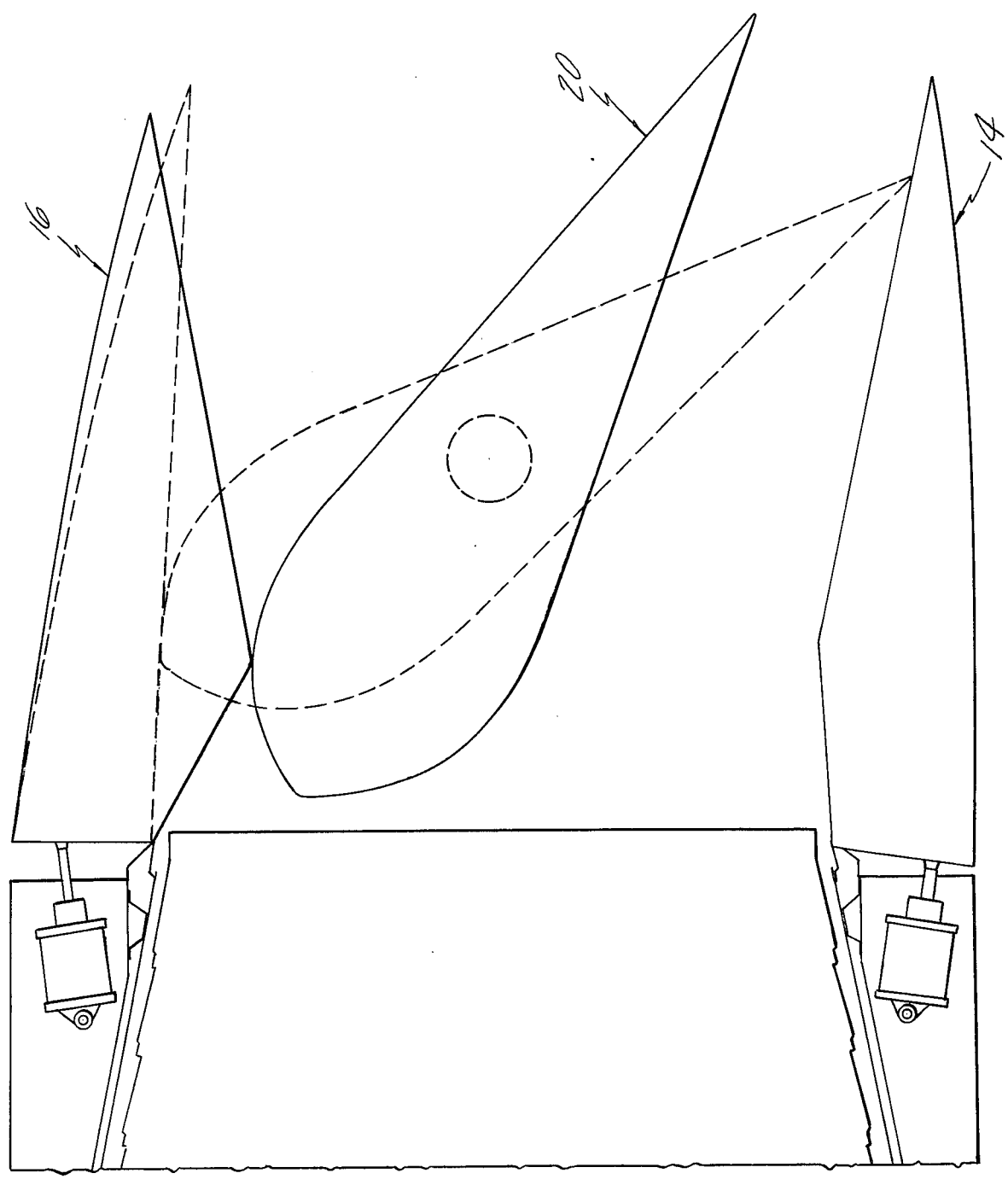
FIG. 5 is a schematic illustration of the closure and vectoring function of the plug nozzle.

Vectoring and metering conditions are best seen by referring to FIG. 5. As noted, when plug 20 is in the full vectored position illustrated in full, the trailing edge cooperates with horizontal wall 14 to form a nozzle angularly disposed to the engine centerline, obviously affording thrust vectoring. In this mode the leading edge at all times will bear against horizontal wall 16 so as to block flow therebetween and cause all the flow to exit through the opening between the trailing edge and horizontal wall 14.

Metering is occasioned during the transition from directing the flow from valve 18 to nozzle 12. Namely when the aircraft is going from a vertical lift condition to normal (horizontal) flight. As plug 20 is positioned from the full blockage position illustrated in phantom (FIG. 5) to the full vector position valve 18 will be adjusted toward close. Hence the nozzle area will increase as valve 18 closes off but the total opened area prescribed between valve 18 and the plug nozzle will at all times be such that it matches the engine flow. Obviously, as plug 20 is rotated open, horizontal wall 16 is actuated to continuously bear against the leading edge assuring that vectoring and metering will be maintained.

Since the plug is exposed to the extremely hot exhaust gases of the power plant another aspect of this invention is means for cooling the plug. It is contemplated that in a fan engine application, fan air can be routed over the walls for cooling purposes.

Figure 6:
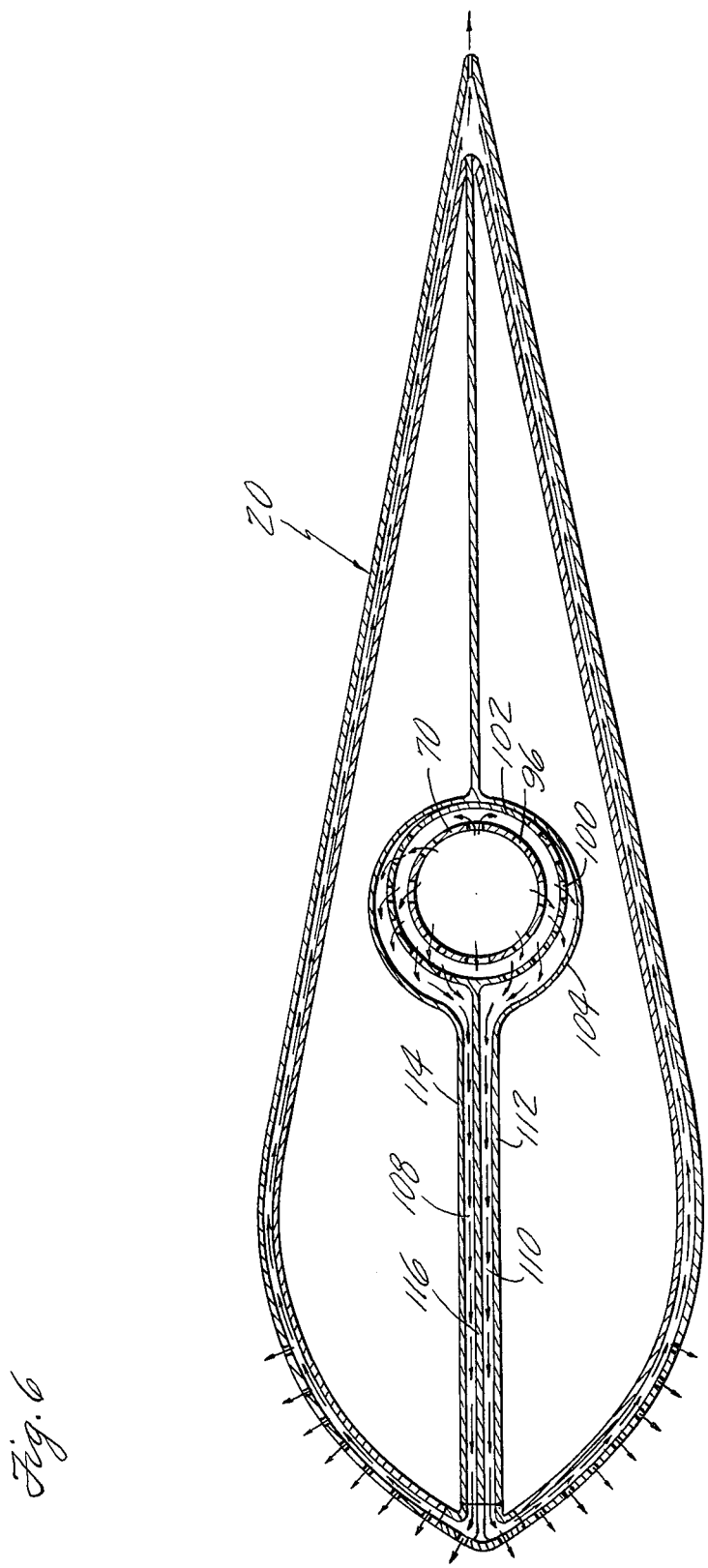
FIG. 6 is a sectional view taken along line 6—6 of FIG. 3.

Relative to the plug, as best seen in FIGS. 2, 4 and 6 cooler air is admitted from upstream of nozzle 12 through pipes 90 and 92 to the common intake connection 94 suitably joined to the support tube 70. Cooling air is admitted into sandwiched rib constructed plug 20 via a plurality of holes 96 formed in the all of tube 70, annular space 98, and the holes 100 formed in the skin of circular sheath 102 of plug 20. A sheath 104, surrounding element 102 is eccentrically mounted relative thereto so that at the aft end the inner wall of 104 bears against element 102 forcing the cooling flow forwardly and through passages 108 and 110 formed between parallelly spaced plate members 112, 114 and 116. Upon reaching the leading edge, the cooling flow is reversed and routed to the trailing edge to be discharged into the exhaust gas stream. The outer skin of plug 20 may be louvered constructed similar to the tail pipe construction to discharge a film of cooling air over the outer skin of the plug. Slots may also be used for this purpose.

It should be understood that the invention is not limited to the particular embodiments shown and described herein, but that various changes and modifications may be made without departing from the spirit or scope of this novel concept as defined by the following claims.

We claim:

1. In combination with a turbine type power plant that generates hot gases for developing thrust, means including a two dimensional nozzle having opposing parallel side walls and opposing collapsible walls defining a box shaped exhaust gas passage for obtaining horizontal thrust, rotatable plug means extending between said parallel side walls in said nozzle, said collapsible wall includes at least three panels each of said panels extending across said parallel side walls, a pair of said panels extending into said nozzle and pivotally connected to each other to define the throat of said nozzle, and the other panel hingedly connected to the end of one of said pairs of panels, means for controlling said collapsible walls to form a variable throat and means for rotating said plug to form with said collapsible walls a blockage of said nozzle, and additional means for controlling said plug and said collapsible walls so that one of said collapsible walls cooperates with said plug to form a blockage and the other wall defines a thrust vectoring and exhaust gas metering nozzle.

2. In the combination as claimed in claim 1 wherein said rotatable plug includes an airfoil shaped member having a leading edge disposed upstream relative to the gaseous flow and a trailing edge and wherein said trailing edge cooperates with said one of said collapsible walls to define the thrust vectoring nozzle.

3. In the combination as claimed in claim 1 including a bell crank, an actuator having a connecting rod connected to one end of said bell crank, a connecting link interconnecting said one of said pairs of panels at a point intermediate the ends thereof, and cam means on said bell crank interconnecting said other panel.

4. In the combination as claimed in claim 1 wherein said panels include outer skin members and honeycomb material sandwiched therebetween.

5. In the combination as claimed in claim 2 a tube extending between said parallelly spaced side walls and projecting therebeyond outside of the gaseous flow stream in said nozzle, means including a stub shaft supported to said tube and spline means operatively connected to said plug and a crank arm integral with said stub shaft for rotating said plug.

6. In the combination as claimed in claim 5 wherein said plug includes an outer and inner skin defining an airfoil planform, ribs extending therebetween and defining therewith channels and means including an opening in at least one end of said tube for admitting cooling air through said tubes, through radial openings formed in said tubes and through said channels.

7. In the combination as claimed in claim 6 including an outer cylindrical shroud eccentrically disposed relative to said tube and spaced therefrom but substantially bearing thereagainst it at one point for directing the cooling flow out of said tube toward the leading edge of said plug.

8. In the combination as claimed in claim 7 wherein said plug includes passage means interconnected to said channels for discharging the cooling flow through the trailing edge of said plug.

9. In the combination as claimed in claim 5 including means on said tube bearing against said side walls for supporting said side walls in substantially parallel relation.

10. In the combination as claimed in claim 7 including means for conducting cooling fluid from the interior of said plug to the outer skin along the leading edge.

11. In combination, a turbine type power plant that generates hot gases for developing thrust, means including a two dimensional nozzle having opposing parallel side walls, a top continuous, aerodynamically smooth, wall means having at least three panels, each of said panels extending across each parallel side walls, a pair of said panels extending into said nozzle and pivotally connected to each other to define an inner wall and the third panel hingedly connected to the end of one of said pairs of panels defining an outer wall, said inner and outer wall moving together as an entity, and bottom continuous, aerodynamically smooth, wall means having inner and outer wall components that move together as an entity defining a rectangularly shaped exhaust gas passage for obtaining horizontal thrust, rotatable plug extending between said parallel side walls in said nozzle, means for controlling said top and bottom walls to form a variable throat and means for rotating said plug to form with said top and bottom walls a blockage of said nozzle, and additional means for controlling said plug and said top flap to bear against said plug to form a blockage while said bottom wall means and plug define a thrust vectoring nozzle.

12. The combination recited in claim 11 including means for controlling said plug and bottom wall when in the thrust vectoring position to throttle the gaseous flow through said nozzle.

13. The combination as recited in claim 11 wherein the axis of rotation of said plug is transverse to the gaseous flow stream and disposed substantially centrally of said plug, and said plug being contoured to be substantially aerodynamically balanced when in the horizontal position.

14. In combination as in claim 12 wherein said inner wall components include the pair of panels hingedly connected together and said outer wall components includes another third panel hingedly connected to the end of one of said other pair of panels.

* * * * *